3,595,704
COMPOSITION FOR THE SURFACE-TREATING OF METALS
Shozo Matsuda, Tadashi Tanaka, and Katushi Saitoh, Kawasaki, and Saburo Ayusawa, Kitakyushu, Japan, assignors to Yawata Iron & Steel Co., Ltd., Tokyo, Japan
No Drawing. Filed Dec. 20, 1968, Ser. No. 785,770
Claims priority, application Japan, Dec. 23, 1967, 42/82,534
Int. Cl. C23f 7/26
U.S. Cl. 148—6.2                         12 Claims

ABSTRACT OF THE DISCLOSURE

A composition for the surface-treatment of metals such as Fe, Zn, Sn and the like for preventing the metals from rusting, particularly suitable for an undercoating of paint, said composition comprising a water-soluble solution containing maleic acid copolymer and water-soluble chromium compound as the main components, wherein particularly polystyrene maleic acid copolymer is selected as the maleic acid copolymer, thereby to obtain the stability of the bath and to prevent the appearance of the film from turning black.

---

This invention relates to compositions for the surface-treating of metals, and more particularly to surface-treating compositions for preventing white-rusting on galvanized iron plates and red-rusting on ordinary steel plates and tin plates.

As a conventional inorganic chemical treating method for steel plates, there is extensively utilized a treatment with a phosphate or chromate. It is also attempted to improve the inorganic chemical treatment by adding to it an organic substance as a reducing agent or a chemical reaction base.

It is also known that a film high in the anti-corrosion and paint adhesiveness is obtained by the surface-treating of a metal with an aqueous solution in which a water-soluble organic high molecular compound and a water-soluble chromium compound are made to coexist.

However, it can not always be expected that with all water-soluble organic high molecular substances favorable results may be obtained. There are often seen antagonistic tendencies between the working adhesiveness to metals, anticorrosion and surface-paintability on the one hand and the stability and practicality of the treating solution on the other hand.

It is already known to select a polyvinylmethylether maleic acid copolymer (which may be abbreviated merely as P.V.M.M. hereinafter), polyvinyl maleic acid copolymer, polyethylene maleic acid copolymer or polyvinyl acetate maleic acid copolymer as the water-soluble organic high molecular compound and to use a mixed aqueous solution of such copolymer with a water-soluble chromium compound for the surface-treatment of a metal. Excellent results are surely obtained by said mixed aqueous solution in reference to the adhesion and anti-corrosion of the film, but there are problems on the aging resistance of the bath, the stability of the anticorrosive performance and the treated appearance.

To cite an example on the treated appearance, in case a zinc-plated steel plate is treated, the treated surface may become black if it is placed in an environment of a high temperature and high humidity for a long period of time, and particularly, in the case of a melt-zinc-plated steel plate, a part of the spangle may become black to deteriorate the appearance.

The surface treating composition of the present invention has as its object prevention of ageing in a metal treating bath and prevention of the film produced therefrom from becoming black, as does a film produced by using a conventional treating composition composed of a maleic acid copolymer and chromium compound, while, on the other hand, retaining advantages of the said conventional film, namely, high paint adhesive and anticorrosive properties.

The present invention is to provide an aqueous coating composition containing about 0.1 to 40% by weight (the percentage being by weight also hereinafter) of a polystyrene maleic acid copolymer (which may be abbreviated as P.S.M. hereinafter) of a polymerization degree of at least about 60 or preferably about 60 to 300 and at most about 60% of a water-soluble chromium compound or preferably ammonium chromate or ammonium dichromate, the pH of the aqueous solution being adjusted to be more than 3.5 or preferably 4 to 7.

In the copolymer P.S.M. to be adopted in the present invention, in order to prevent the reduction of the water-solubility and to inhibit the production of polystyrene as much as possible, it is necessary that the rate of styrene in the styrene/maleic acid copolymerization ratio in the copolymer should not be too high and, on the other hand, in order to prevent etching and blacking on the treated surface and to prevent the maleic acid monomer from remaining, it is necessary to avoid elevating the maleic acid rate.

In the binary copolymer, the most desirable mixing ratio is an equimolar ratio. The copolymer resin to be used in the present invention may be a trinary copolymer in some case.

Ammonium chromate or ammonium dichromate is particularly preferable for the water-soluble chromium compound. There may be added ammonium chromate in a range of 0.03 to 60% and ammonium dichromate in a range of 0.025 to 50%.

Further, in order to stabilize the performance of the treating solution of the present invention, it is desirable that the $Cr^{+6}/T.Cr$ ratio be made a fixed condition or preferably $Cr^{+6}/T.Cr > 50\%$.

The object to be treated is a material having such metallic surface as of Zn, Fe or Sn. The treating composition is effective, particularly for Zn. In this case, the process for treating steel plates with the present coating composition is carried out with dipping, flowing, spraying or roller painting, as is usually practiced. If required, the composition is squeezed with rolls and is naturally or forcibly dried so that a strong anticorrosive coating film may be formed.

The spraying is the most practical as a means of continuously treating band-shaped metal sheets.

In this case, in reference to the amount of deposition of the film, a favorable anticorrosion and adhesiveness of the film can be obtained with an amount of total chromium deposition within a range of 5 to 200 mg./m.$^2$. In the case that a particular precaution should be paid on the appearance, the range of 10 to 20 mg./m.$^2$ is recommendable.

Further, in this case silicone is used to be added as a defoaming agent in an amount of about 0.005 to about 0.1% to the bath.

The surface-treating composition of the present invention contains a polystyrene maleic acid copolymer (P.S.M.) and a trivalent or hexavalent water-soluble chromium compound as main components. But, by further adding such water-soluble inorganic compounds, which are usually used in an inorganic chemical treatment, as for example, a borate or phosphate, such metallic ions as of Zn, Cd, Al or Mn or the like, the treating performance may be improved.

As to the addition of the inorganic acid compound an ammonium is to be added in the form of its salt and preferably in an amount of about 0.1 to 2%.

Further, any of the following organic substances may be added in some case:

(1) Polyalcohol high molecular compounds, polyvinyl acetate partial hydrolysis products (P.V.A.'s), polyvinyl alcohol maleic acid copolymers, polyethylene oxides, methylol compounds of urea or melamine and their derivatives and polymethylol phenols.
(2) Polycarboxylic acids, polyacrylic acids and methacrylic acids.
(3) Water-soluble polysulfonic acids of organic high molecular compounds.
(4) Organic amines, for example, alkanolamines (triethanolamine).
(5) Other water-soluble natural high molecular compounds and their derivatives including, for example, soluble starch, water-soluble cellulose, ethylene oxide additives, amino acids, cellulose partial lower etherified substances, alcohols, cane sugar and oxalic acid.

The object of adding these additives is more auxiliary and additional to the main components in effecting improvements of the anticorrosion, final-paintability, weather-proofness and durability of the film and improvements of the stability of the treating solution and its wettability to metals, and the amount to be added is preferably in a range of about 0.1 to 2.0%.

The addition of the organic amine or specifically the alkanolamine among these organic compounds is very effective to remarkably improve the anticorrosion of the treated film and to accelerate the insolubilization of the film. However, if the amount of its addition is too large, the reduction will proceed in excess, resulting in an extreme deterioration of the anticorrosion. Therefore, it is preferable to be added in a range of about 0.1 to 2.0%.

As understood also from the comparative examples in the later described Table 1, it is recognized that the coating composition of the present invention is remarkably superior to any conventional one in the stability of the bath and the appearance after the treatment.

As compared with P.V.M.M. and other maleic acid copolymers, the polystyrene maleic acid copolymer (P.S.M.) adopted in the present invention is so lower in the velocity of a reduction reaction from $Cr^{+6}$ to $Cr^{+3}$ in the treating bath that the aging, resistance of the bath is much improved, the anticorrosion performance is more stabilized and the bath stability is far increased.

To cite a concrete example, when an aqueous solution having a pH of 5, composed of 4 parts of P.V.M.M. and 1.5 parts of ammonium chromate is preserved at 70° C. for 70 days, about 100% of the resin is reduced and thereby the anticorrosion is remarkably deteriorated. On the other hand, with such aqueous solution having a pH of 6.5, composed of 4 parts of P.S.M. and 1.5 parts of ammonium chromate as is adopted in the present invention, an excellent bath stability can be obtained, because only about 5% of the resin is reduced.

As to the performance of etching the treated material, a dissolution of the treated metal into the bath is not caused by the P.S.M. adopted in the present invention, as compared with the P.V.M.M. Therefore, when using the P.S.M., there occurs no such a deterioration of the appearance as the blacking in the spangle of a zinc plating.

Further, concerning the insolubility of the treated film too, it is recognized that the P.S.M. used in the present invention is superior to any other maleic acid copolymer, because the film formed by using the P.S.M. is insolubilized on the acidic side of the solution (of pH of less than 3) or at a high concentration for a short time.

Further, in the chemical proofness, solvent-proofness and appearance after preserved for a long period of time of the treated film, the polystyrene maleic acid copolymer can be said to be most excellent. It is also very high in the paintability and anticorrosion.

As regards the paintability, the treated film of the present invention, adopting the P.S.M., has no paint selectively and shows a favorable painting adhesiveness with any of alkyd series, vinyl chloride and acrylic oily paints and lacquers.

As regards the solvent-proofness, even if the film treated with the coating composition of the present invention would be dipped in gasoline for 6 months, it will not be denatured at all.

Examples of the present invention shall be explained in the following:

EXAMPLE 1

A clean galvanized iron plate was dipped in an aqueous solution (the P.S.M treating solution of the present invention) composed of 4% of a polystyrene maleic acid copolymer (of a polymerization degree of 140) and 1% ammonium chromate, said solution having a pH of 6.5, had the excess of the solution squeezed with rolls and was then heated and dried at 150° C. for 5 seconds (generally at 100 to 300° C. for at least 2 seconds) to form uniform films of total Cr contents of 5, 10, 20 and 30 mg./m.$^2$.

At the same time, reference samples were prepared for a comparative test, that is, a galvanized iron plate treated by using the P.V.M.M., instead of the P.S.M., with a result of producing a total Cr deposit of 10 mg./m.$^2$ thereon under the same conditions as above-mentioned and also an untreated galvanized iron plate.

TABLE 1.—COMPARATIVE TEST RESULTS OF PERFORMANCES OF GALVANIZED IRON PLATES

| Kinds | P.S.M. treating solution (present invention) | | | | P.V.M.M. treated | Untreated |
|---|---|---|---|---|---|---|
| Total Cr in mg./m.$^2$ | 5 | 10 | 20 | 30 | 10 | |
| Salt water spraying [1] | 1 day | 3 days | 5 days | 7 days | 3 days | 1 hour. |
| Paintability [2] | Favorable | Favorable | Favorable | Favorable | Favorable | Favorable. |
| Relative humidity, percent [3] | 0 to 5 | 0 to 0 | 0 to 0 | 0 to 0 | 0 to 0 | 100. |
| Appearance change [4] | No blacking | No blacking | No blacking | No blacking | Blacking | |

[1] The salt water spraying shows the time until white rusts were produced according to JIS Z 2371 (also in Table 2).
[2] The paintability shows the total results of the Ericsen test with 10 mm. extrusion, the square mesh test and the Du Pont impact test with 50 and 30 cm./kg. by 0.5 inch on each plate painted with 300 mg./dm.$^2$ of a baked melamine alkyd resin paint (also in Table 2).
[3] The relative humidity shows the white rust area in percent after the elapse of 24 hours at 70° C. under a relative humidity of 100%.
[4] The appearance change shows the change of the appearance at the time of the test in footnote 3 above.

By the way, when the surface-treating composition (P.S.M.) of the present invention was applied to a cold-rolled steel plate or tin-plated steel plate under the same conditions as in the above, there were shown a favorable anticorrosion and painting performance.

EXAMPLE 2

A zinc-electroplated iron plate (the thickness of the Zn plating being 3μ) was sprayed on the surface with an aqueous solution having a pH of 7, composed of 5.0% of a polystyrene maleic acid copolymer of a polymerization degree of 140 and 4.5% ammonium chromate with an addition of 0.005% (on the solution) silicone as a defoaming agent, had the excess solution squeezed with rolls and was then heated and dried at 150° C. for 10 seconds to form uniform films of total Cr contents of 10, 20 and 30 mg./m.²

TABLE 2.—RESULTS OF PERFORMANCES OF GALVANIZED IRON PLATES TREATED WITH THE COMPOSITION OF THE PRESENT INVENTION

| Total Cr in mg./m.² | 10 | 20 | 30 |
|---|---|---|---|
| Salt water spraying | 3 days | 5 days | 7 days. |
| JIS Z 0228 moisture bath test | Several points. 70. | Some. 15 days. | Some. More than 15 days. |
| Paintability | Favorable | Favorable | Favorable. |

EXAMPLE 3

An aqueous solution having a pH of 7.5, composed of 5.0% of a polystyrene maleic acid copolymer of a polymerization degree of 140 and 7.5% ammonium chromate with an addition of 0.01% silicone on the solution was applied and the product was subjected to the test under substantially the same conditions as in Example 2. A favorable anticorrosion and paint adhesiveness were obtained.

EXAMPLE 4

An aqueous solution having a pH of 4.5, composed of 5.0% of a polystyrene maleic acid copolymer of a polymerization degree of 60 and 1.0% ammonium chromate with an addition of 0.01% silicone on the solution was applied and the product was subjected to the test under substantially the same conditions as in Example 2. The anticorrosion and paintability of the film were very good. The total Cr was 5 and 10 mg./m.².

EXAMPLE 5

When films of total Cr deposit of 5 and 10 mg./m.² were formed and tested by treatments under substantially the same conditions as in Example 2 with an aqueous solution having a pH of 6, composed of 2.5% of a polystyrene maleic acid copolymer of a polymerization degree of about 10,000 and 0.75% ammonium chromate with an addition of 0.01% silicone on the solution, favorable results were obtained on the anticorrosion, paintability and all other performances.

What is claimed is:

1. A coating composition comprising an aqueous solution of a pH of more than 3.5 having as main components 0.1 to 40% by weight of a polystyrene maleic acid copolymer and a water-soluble chromium compound contained in an amount at least sufficient to provide corrosion protection and up to at most 60% by weight.

2. A coating composition comprising an aqueous solution of a pH of more than 3.5 having as main components 0.1 to 40% by weight of a polystyrene maleic acid copolymer and a water-soluble chromium compound contained in an amount at least sufficient to provide corrosion protection and up to at most 60% by weight and further containing about 0.1 to 2.0% by weight of a alkanolamine.

3. A coating composition according to claim 2, where said alkanolamine is triethanolamine.

4. A coating composition comprising an aqueous solution of a pH of more than 3.5 having as main components 0.1 to 40% by weight of a polystyrene maleic acid copolymer and a water-soluble chromium compound contained in an amount at least sufficient to provide corrosion protection and up to at most 60% by weight and further containing about 0.1 to 2.0% by weight of a substance selected from the group consisting of a water-soluble borate, a water-soluble phosphate and ions of a metal selected from the group consisting of Zn, Cd, Al and Mn.

5. A coating composition according to claim 4, wherein said water-soluble chromium compound is a compound selected from the group consisting of ammonium chromate and ammonium dichromate.

6. A coating composition according to claim 1, wherein the $Cr^{+6}$/T.Cr ratio in said water-soluble chromium compound is more than about 50% by weight.

7. A coating composition according to claim 1, wherein the polymerization degree in said polystyene maleic acid copolymer is at least about 60.

8. A coating composition according to claim 1, wherein the mixing ratio in said polystyrene maleic acid copolymer is about 1/1 (by mol).

9. A coating composition according to claim 7, wherein in said polystyrene maleic acid copolymer, the polymerization degree is about 60 to about 300 and the mixing ratio is about 1/1.

10. A coating composition comprising an aqueous solution of a pH of more than 3.5 having as main components 0.1 to 40% by weight of a polystyrene maleic acid copolymer and a water-soluble chromium compound contained in an amount at least sufficient to provide corrosion protection up to at most 60% by weight and further containing as a defoaming agent at least about 0.005% by weight of silicone on the solution.

11. A coating composition according to claim 1, wherein the pH of said aqueous solution is adjusted to be 4 to 7.

12. A process for surface-treatment of a metal selected from the group consisting of Fe, Zn and Sn comprising applying a treating solution comprising an aqueous solution of a pH of more than 3.5 having as main components 0.1 to 40% by weight of a polystyrene maleic acid copolymer and a water-soluble chromium compound contained in an amount at least sufficient to provide corrosion protection and up to at most 60% by weight to said metal so that the total amount of deposition of chromium may be 5 to 200 mg./m.².

References Cited

UNITED STATES PATENTS

| 2,756,163 | 7/1956 | Herrick et al. | 117—132X |
| 3,132,055 | 5/1964 | Tanaka et al. | 148—6.2X |
| 3,175,964 | 3/1965 | Watanabe et al. | 148—6.2X |

RALPH S. KENDALL, Primary Examiner

C. WESTON, Assistant Examiner

U.S. Cl. X.R.

117—132; 260—78.5